A. L. HOLLEY.

Stoppers for Ingot Molds.

No. 5,317. Reissued March 11, 1873.

WITNESSES:

Jas. L. Crow

Walter Allen

INVENTOR:

Alexander Lyman Holley

By Knight Bros Attorneys.

UNITED STATES PATENT OFFICE.

ALEXANDER LYMAN HOLLEY, OF BROOKLYN, NEW YORK.

IMPROVEMENT IN STOPPERS FOR INGOT-MOLDS.

Specification forming part of Letters Patent No. 129,957, dated July 30, 1872; reissue No. 5,317, dated March 11, 1873.

DIVISION A.

*To all whom it may concern:*

Be it known that I, ALEXANDER LYMAN HOLLEY, of the city of Brooklyn, county of Kings and State of New York, formerly of Harrisburg, Pennsylvania, have invented a certain Improvement in Apparatus for Casting Ingots of Iron and Steel, of which the following is a specification:

This invention relates to casting ingots or masses of iron or steel when the molds are filled from the bottom; and consists in improved means for stopping the tops of such molds at different heights.

To enable others to put these improvements into use, I will describe several forms of my invention, reference being had to the accompanying drawing forming part of this specification, in which—

Figure 1:
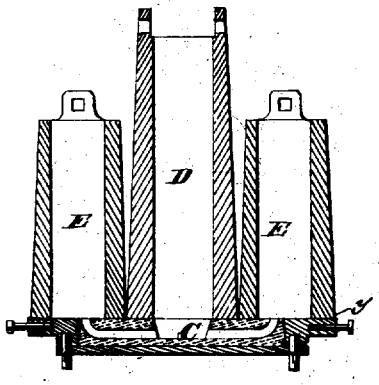
Figure 7:
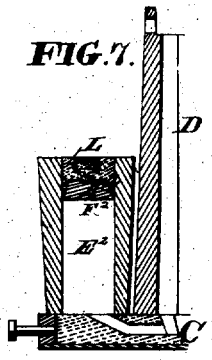
Figure 8:
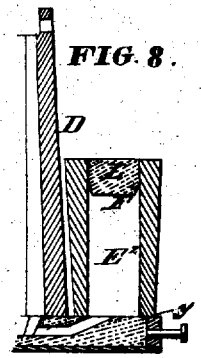
Figure 2:
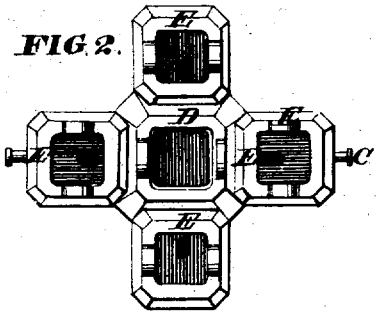
Figure 4:
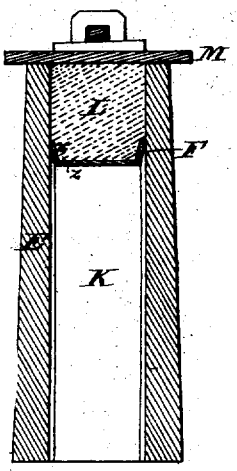
Figure 5:
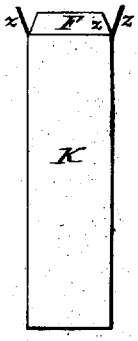
Figure 3:
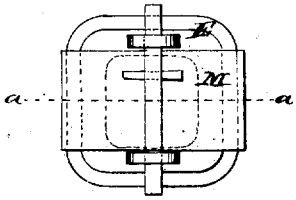
Figure 6:
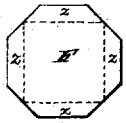
Figure 9:
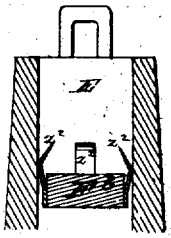

Figure 1 is a vertical section of a group of ingot-molds to which my invention is applied. Fig. 2 is a plan view of the same. Fig. 3 is a plan view of a closed mold on a larger scale. Fig. 4 is a vertical section on the line *a a*, Fig. 3, illustrating the application of a stopper. Fig. 5 is an elevation of a stopper and supporting-post as shown in Fig. 4. Fig. 6 is a plan view of a blank of the form of stopper shown in Figs. 4 and 5. Figs. 7 and 8 are vertical sections of downwardly-tapering molds with modified stoppers applied. Fig. 9 is a vertical section, illustrating another modification.

To produce rails, axles, &c., of different weights, without making scrap in excess, ingots must be made of the various suitable weights. To avoid the cost of different sets of ingot-molds for each required weight of ingots, it is desirable to cast ingots of various weights, and hence various lengths, in the same set of molds. My improvements consist in stopping off a mold at any required height by means that may be easily and quickly applied, and in such a manner that the ingot will not be likely to crack. One method of doing this is shown in Fig. 4, which is a vertical section of a mold, E, and stopper F. The stopper is a piece of sheet-iron or steel, Fig. 6, with the edges turned up so as to form elastic flanges *z*, and to appear in side elevation as shown in Fig. 5. If the mold E has—say, one or two inches taper, the flanges *z* may be bent so as just to enter the large end or bottom of the mold E. The stopper is then set on a post, K, Fig. 5, the post being as long as the required ingot. The mold E is then raised and brought over the stopper and post, and lowered into position, as shown in Fig. 4. The flanges *z* will now have been bent more nearly to a right angle by the tapering sides of the mold, and the stopper will be thus wedged sufficiently fast to stay in place when the post is removed. Before the post is removed the top of the mold above the stopper F is filled with loam or sand L, by preference a little damp, and slightly rammed. A few small—say, one-eighth inch—vent-holes are previously made in the stopper F, and vent-holes may be pricked in the sand. A plate, M, is then laid on the sand and wedged down in the usual manner. The liquid iron or steel will rise up against the stopper F, and the gases will pass off through the vent-holes and the sand L. When the ingot thus formed contracts in cooling, it will easily pull down the stopper F. The sand L prevents any "fin" of iron or steel from running up the side of the mold beyond the stopper. A thin film of steel chills and acquires great tenacity while the body of the ingot is still liquid and pasty, and easily pulled apart, so that such a film, hooking over the top of the mold or otherwise getting fast, prevents the top part of the ingot from coming down as the mass cools and contracts, and thus the ingot is cracked. In case the ingot-mold has very little or no taper the flanges *z* of the stopper may be bent in by hand, while they are being entered into the bottom of the mold. These flanges should in all cases press hard enough against the sides of the mold to stay in place when the post is removed.

Another method of stopping off the ingot-mold at any required height is shown in Fig. 7, in which $E^3$ is an ingot-mold, and $F^3$ a cast-iron stopper, which may be placed at any required height in the mold. In order to prevent any fin of iron or steel from running up the side of the mold beyond the stopper I fill the mold around and above the stopper, as at L, with loam or sand, by preference, rammed, vented, and held down by a plate, M, Figs. 3 and 4, as before described. The mold $E^2$ is placed on the flask with its large end upward. When the mold is filled with iron or steel, and the ingot thus formed shrinks, the upper end of it cannot come down on account of the taper of the mold; but the sprue will bend sufficiently to let the lower end of the ingot rise as it shrinks; and thus, if the joint between the mold and the flask, at *y*, is tight enough to prevent the liquid iron or steel from running into the joint, the ingot can contract without cracking. This joint may be made tight in any suitable manner. I prefer a paste of fire-clay, sand, and plumbago, or other suitable refractory material, on the top of the flask or on the bottom of the mold before the mold is set upon the flask. The flask should be warm when used, and the warmth of the flask will very quickly dry the paste so as to prevent its "blowing" when the iron or steel strikes it. The paste squeezed out from under the mold may also, if necessary, be rammed into the joint *y* by a suitable tool. If the mold were set on the flask with the small end upward, and this small end covered so that a fin of iron or steel could run and hook over it, the ingot being held fast by the taper at the large end, and by this fin at the small end would be likely to be pulled apart by the shrinkage.

Fig. 8 illustrates the application of a sheet-metal stopper, F, to a downwardly-tapering mold, $E^2$. Additional weights or parts to hold down this stopper may be added, if required. A fin of iron or steel running past the form of stopper shown in Figs. 7 and 8 will not cause the ingot to crack so long as the joint *y* is properly made; but I prefer to put some sand on and about the stoppers to prevent the waste of iron or steel.

A modification of the form of stopper shown in Figs. 4, 5, 6, and 8 is illustrated in Fig. 9, where $z^2$ represents friction-springs applied to a cast-iron stopper, $F^3$, to support the same at different heights.

The invention is primarily designed for molds arranged in groups and filled from central sprue-molds D, as illustrated in Figs. 1, 2, 7, and 8, but is not confined to this application.

What I claim, and desire to secure by these Letters Patent, is—

1. The combination, with a bottom-casting ingot-mold, of a suitable device or devices capable of stopping off the mold at various heights, substantially as and for the purposes set forth.

2. A stopper for ingot-molds, supported at different heights by elastic flanges or friction-springs, substantially as herein described.

3. The flanged sheet-metal stopper F for stopping off ingot-molds at various heights, constructed and operating substantially as described.

4. The combination of an adjustable metallic stopper and a loam or sand filling, L, above the same, as herein set forth.

5. The combination of an adjustable metallic stopper, F, a loam or sand filling, L, and a supporting-plate, M, applied and secured substantially as illustrated.

A. L. HOLLEY.

Witnesses:
P. BARNES,
GRAM CURTIS.